United States Patent
Yang

(10) Patent No.: US 12,165,418 B2
(45) Date of Patent: Dec. 10, 2024

(54) OBJECT DETECTION APPARATUS, OBJECT DETECTION METHOD, AND OBJECT DETECTION PROGRAM

(71) Applicant: JVCKENWOOD Corporation, Yokohama (JP)

(72) Inventor: Yincheng Yang, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 400 days.

(21) Appl. No.: 17/731,372

(22) Filed: Apr. 28, 2022

(65) Prior Publication Data
US 2022/0254167 A1 Aug. 11, 2022

Related U.S. Application Data

(63) Continuation of application No. PCT/JP2020/028495, filed on Jul. 22, 2020.

(30) Foreign Application Priority Data

Nov. 1, 2019 (JP) .................................. 2019-199782

(51) Int. Cl.
G06V 20/58 (2022.01)
G06T 7/11 (2017.01)
G06V 10/25 (2022.01)

(52) U.S. Cl.
CPC .............. G06V 20/58 (2022.01); G06T 7/11 (2017.01); G06V 10/25 (2022.01); *G06T 2207/20132* (2013.01); *G06T 2207/30252* (2013.01)

(58) Field of Classification Search
CPC .......... G06V 20/58; G06V 10/25; G06T 7/11; G06T 2207/20132; G06T 2207/30252;
(Continued)

(56) References Cited

U.S. PATENT DOCUMENTS

2015/0269449 A1* 9/2015 Kosaki .................... G06F 18/28
382/103
2019/0145765 A1 5/2019 Luo et al.
(Continued)

FOREIGN PATENT DOCUMENTS

| CN | 107730906 A | 2/2018 |
| JP | 2015069064 A | 4/2015 |
| WO | 2019201035 A1 | 10/2019 |

OTHER PUBLICATIONS

International Search Report for the corresponding PCT Application No. PCT/JP2020/028495 mailed Oct. 6, 2020, 4 pages.
(Continued)

*Primary Examiner* — Edward F Urban
*Assistant Examiner* — Wassim Mahrouka
(74) *Attorney, Agent, or Firm* — Shih IP Law Group, PLLC

(57) ABSTRACT

A first object detection unit detects an object from a captured image and outputs object position information, in a non-high speed processing mode. A switching unit switches to a high-speed processing mode when the first object detection unit outputs the object position information. An image trimming unit extracts a trimmed image from the captured image based on the object position information output from the first object detection unit, in the high-speed processing mode. A second object detection unit detects an object from the trimmed image and outputs the object position information. A protrusion determination unit determines whether the object thus detected protrudes from the trimmed image. When it is determined that the object thus detected protrudes from the trimmed image, the switching unit switches to the non-high speed processing mode.

7 Claims, 7 Drawing Sheets

(58) Field of Classification Search
CPC ... G06T 7/70; G06T 7/10; G06T 2207/20081; G06T 2207/20084; G06N 3/0464; G06N 3/08; G06N 3/045; G08G 1/166; H04N 7/188

See application file for complete search history.

(56) References Cited

U.S. PATENT DOCUMENTS

2019/0208979 A1    7/2019  Bassa et al.
2020/0175401 A1*  6/2020  Shen .................... G06N 3/045

OTHER PUBLICATIONS

International Preliminary Examination Report on Patentability (I) from Application No. PCT/JP2020/028495 mailed May 3, 2022, 8 pages.
Extended European Search Report from EP20881382.4 mailed Nov. 29, 2022, 8 pages.

* cited by examiner

OBJECT DETECTION APPARATUS, OBJECT DETECTION METHOD, AND OBJECT DETECTION PROGRAM

BACKGROUND OF THE INVENTION

1. Field of the Invention

The present invention relates to a technology of detecting an object from an image.

2. Description of the Related Art

A camera such as a drive recorder mounted on an automobile can be put to use to avoid a collision accident or an accident causing injury or death by using the camera to capture an image of the scene around the automobile to detect an object such as another vehicle, a pedestrian, and an obstacle in real time and outputting an alert.

Patent literature 1 discloses a subject tracking device configured to detect a subject included in successively acquired images, display a tracking frame showing that the subject is being tracked, and letting the photographer recognize the tracking state of the subject appropriately.

[Patent Literature 1] JP2015-69064

In order to avoid a collision accident or an accident causing injury or death, it is necessary to detect an object in real time accurately from a captured image. Object detection is useless for prevention of accidents unless the frame rate is at least 15 frames per second (fps) in the case of ordinary roads and at least 30 fps in the case of express ways. In an object detection process using a learning algorithm like deep learning, convolution operation consumes quite a lot of time, posing a problem in that high-speed processing is not possible.

SUMMARY OF THE INVENTION

An embodiment of the present invention addresses the aforementioned issue and an object thereof is to provide a technology for detecting an object from an image at a high speed.

An object detection apparatus according to an embodiment of the present invention includes: a first object detection unit (30) that detects an object from a captured image and outputs object position information, in a non-high speed processing mode; a switching unit (20) that switches to a high-speed processing mode when the first object detection unit outputs the object position information; an image trimming unit (40) that extracts a trimmed image from the captured image based on the object position information output from the first object detection unit, in the high-speed processing mode; a second object detection unit (60) that detects an object from the trimmed image and outputs the object position information; and a protrusion determination unit (70) that determines whether the object detected by the second object detection unit protrudes from the trimmed image. When it is determined that the object detected by the second object detection unit protrudes from the trimmed image, the switching unit (20) switches to the non-high speed processing mode.

Another embodiment of the present invention is an object detection method. The method includes: detecting an object from a captured image and outputting object position information, in a non-high speed processing mode; switching to a high-speed processing mode when the object position information is output; extracting a trimmed image from the captured image based on the object position information as output, in the high-speed processing mode; detecting an object from the trimmed image and outputting the object position information; and determining whether the object detected from the trimmed image protrudes from the trimmed image. When it is determined that the object detected from the trimmed image protrudes from the trimmed image, the non-high speed processing mode is switched into use.

Optional combinations of the aforementioned constituting elements, and implementations of the disclosure in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
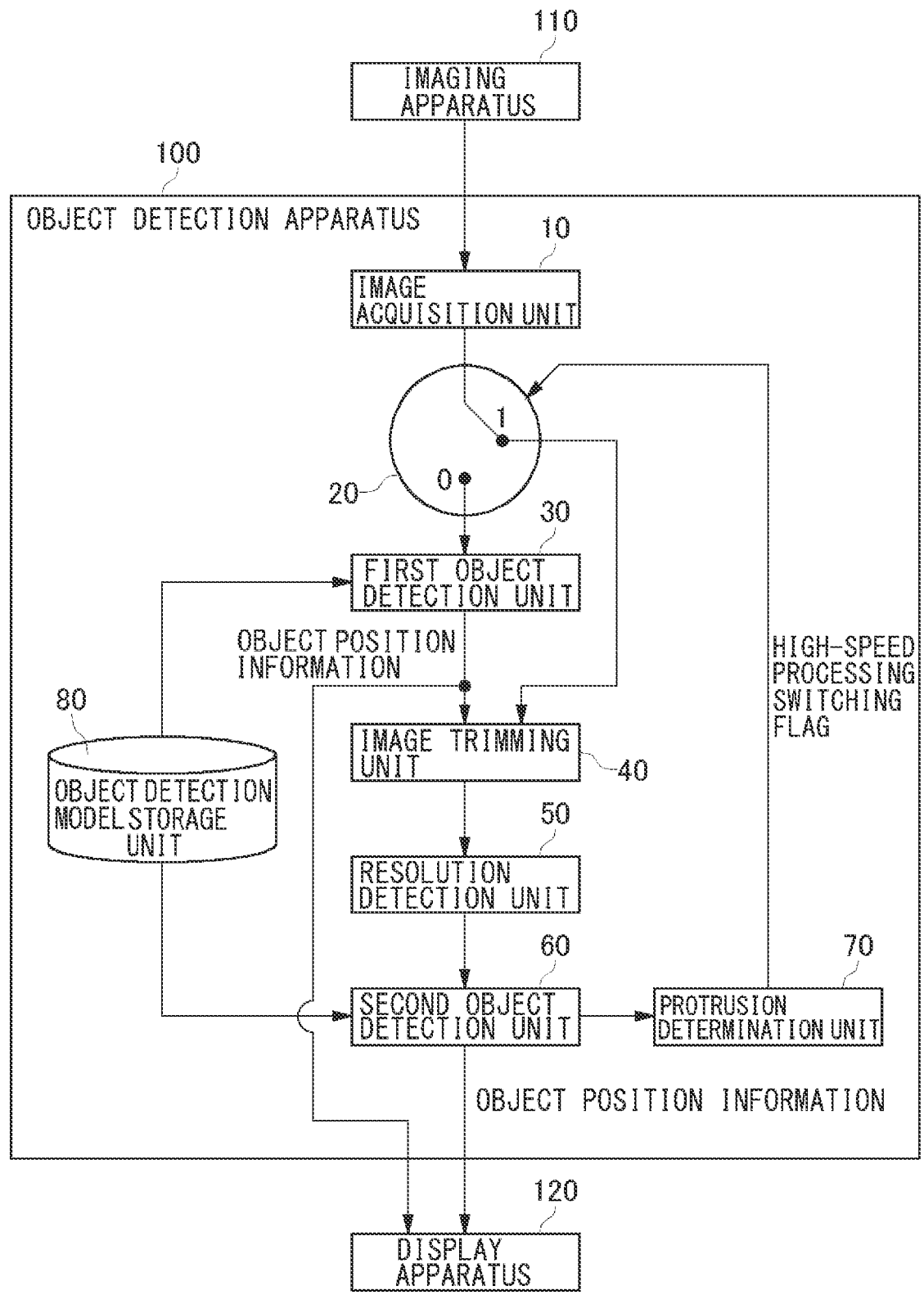
FIG. 1 shows a configuration of an object detection system according to an embodiment of the present invention.

FIG. 1 shows a configuration of an object detection system according to an embodiment of the present invention. The object detection system includes an imaging apparatus 110, an object detection apparatus 100, and a display apparatus 120. The imaging apparatus 110 is exemplified by a vehicle-mounted camera such as a drive recorder mounted on a vehicle. The display apparatus 120 is exemplified by a vehicle-mounted display such as a car navigation system and a head-up display mounted on a vehicle. The object detection apparatus 100 may be implemented as a part of the function of the drive recorder or implemented as a part of the function of the car navigation system or the head-up display. Alternatively, all functions of the imaging apparatus 110, the object detection apparatus 100, and the display apparatus 120 may be integrally implemented as one apparatus.

The object detection apparatus 100 includes an image acquisition unit 10, a switching unit 20, a first object detection unit 30, an image trimming unit 40, a resolution changing unit 50, a second object detection unit 60, a protrusion determination unit 70, an object detection model storage unit 80.

The imaging apparatus 110 supplies successively captured images to the image acquisition unit 10 of the object detection apparatus 100.

The switching unit 20 switches between a non-high speed processing mode and a high-speed processing mode according to the value of a high-speed processing switching flag. The high-speed processing switching flag of 0 indicates the non-high speed processing mode, and the high-speed processing switching flag of 1 indicates the highs-speed processing mode. The initial value of the high-speed processing switching flag is 0.

When the high-speed processing switching flag is 0, i.e., in the case of the non-high speed processing mode, the captured image acquired by the image acquisition unit 10 is supplied to the first object detection unit 30. When the high-speed processing switching flag is 1, i.e., in the case of the high-speed processing mode, the captured image acquired by the image acquisition unit 10 is supplied to the image trimming unit 40, skipping the first object detection unit 30.

In the non-high speed processing mode, the first object detection unit 30 is in operation, and the display apparatus 120 overlays an object detection frame on the captured image as displayed, based on object position information output by the first object detection unit 30.

In the high-speed processing mode, the first object detection unit 30 is not in operation. The image trimming unit 40, the resolution changing unit 50, and the second object detection unit 60 operate to process the current image frame by using the object position information output by the first object detection unit 30 in response to a past image frame, and the display apparatus 120 overlays an object detection frame on the captured image as displayed, based on the object position information output by the second object detection unit 60.

The first object detection unit 30 and the second object detection unit 60 use a trained object detection model to detect an object from an image by a learning algorithm like deep learning. The processing in the first object detection unit 30 and the second object detection unit 60 may be implemented, either in part or in their entirety, by an application specific integrated circuit (ASIC) such as an artificial intelligence (AI) accelerator dedicated to convolution operation in a neural network.

The first object detection unit 30 receives an input of a captured image with a high resolution and performs a convolution operation, using, for detection of an object from the entirety of a captured image, an object detection model for high resolution. The resolution of a captured image input to the convolution operation of deep learning is a high resolution exemplified by 448 pixels in the vertical direction by 448 pixels in the horizontal direction. When the resolution of a captured image is larger than 448 pixels in the vertical direction by 448 pixels in the horizontal direction, the first object detection unit 30 reduces the resolution of the captured image to 448 pixels in the vertical direction by 448 pixels in the horizontal direction. Since input data with a high resolution is used, the detection precision is very high, but the volume of operation is large so that a long period of time is consumed for computation.

The second object detection unit 60 receives an input of a trimmed image with a medium resolution or a low resolution and performs a convolution operation, by using, for detection of an object from an image derived from trimming a captured image, an object detection model for medium resolution or low resolution. The resolution of a trimmed image input to the convolution operation of deep learning is a medium resolution exemplified by 224 pixels in the vertical direction by 224 pixels in the horizontal direction or a low resolution exemplified by 112 pixels in the vertical direction by 112 pixels in the horizontal direction. The object detection model for medium resolution can perform an operation with a computation time ¼ that of the objection detection model for high resolution. The object detection model for low resolution can perform an operation with a computation time ¹⁄₁₆ that of the objection detection model for high resolution. Thus, the use of input data with a medium resolution or a low resolution lowers the detection precision but reduces the volume of operation significantly and shortens the computation time.

By switching between the non-high speed processing mode performed by the first object detection unit 30 and the high-speed processing mode performed by the second object detection unit 60 depending on the condition, it is possible to reduce the volume of operation and increase the computing speed, while maintaining the detection precision at the same time.

In the non-high speed processing mode, the first object detection unit 30 uses an object detection model for high resolution stored in the object detection model storage unit 80 to detect an object from the entirety of a captured image. The first object detection unit 30 supplies the object position information detected from the entirety of a captured image to the image trimming unit 40 and the display apparatus 120. The object position information is given in the form of coordinate values of a frame encircling a detected object (referred to as "object detection frame").

When the first object detection unit 30 outputs the object position information, the switching unit 20 updates the high-speed processing switching flag from 0 to 1 to switch to the high-speed processing mode.

In the high-speed processing mode, the image trimming unit 40 trims and extracts an image from a captured image acquired from the image acquisition unit 10, based on the object position information supplied from the first object detection unit 30. A trimmed image is extracted in a size larger than the object detection frame encircling the detected object.

The image trimming unit 40 supplies the trimmed image thus extracted to the resolution changing unit 50. The resolution changing unit 50 changes the resolution of the trimmed image. For example, the resolution changing unit 50 changes the resolution to a medium resolution of 224 pixels in the vertical direction by 224 pixels in the horizontal direction or a low resolution of 112 pixels in the vertical direction and 112 pixels in the horizontal direction depending on the size of the trimmed image. When the aspect ratio of the trimmed image is other than 1:1, the resolution changing unit 50 changes the aspect ratio of the trimmed image to 1:1. When the extracted trimmed image is comprised of 336 pixels in the vertical direction and 392 pixels in the horizontal direction, for example, the vertical pixels of the trimmed image are reduced to ⅔, i.e., 224 pixels, and the horizontal pixels are reduced to 4/7, i.e., 224 pixels. A publicly known image compression technology or a pixel skipping technology may be used as a method of reducing the resolution.

The object detection apparatus 100 need not necessarily be provided with the resolution changing unit 50. When the resolution changing unit 50 is not provided, the second object detection unit 60 may change the resolution of a trimmed image. Further, the resolution of a trimmed image may not be changed, depending on the resolution and the aspect ratio that the object detection model is compatible with. When the extracted trimmed image is comprised of 224 pixels in the vertical direction and 224 pixels in the horizontal direction, for example, the second object detection unit 60 inputs the trimmed image to the object detection model for medium resolution without changing the resolution of the trimmed image.

The second object detection unit 60 uses an object detection model from the object detection model storage unit 80 suited to the resolution of the trimmed image and detects an object from the trimmed image. When the trimmed image has a medium resolution, the object detection model for medium resolution is used. When the trimmed image has a low resolution, the object detection model for low resolution is used.

The second object detection unit 60 supplies the position information on the object detected from the trimmed image to the display apparatus 120. The object position information is given in the form of coordinate values of the object detection frame.

In the case of the non-high speed processing mode, the display apparatus 120 overlays an object detection frame on the captured image as displayed, based on object position information supplied from the first object detection unit 30. In the case of the high-speed processing mode, the display apparatus 120 overlays an object detection frame on the captured image as displayed, based on the object position information supplied from the second object detection unit 60.

In the case of the non-high processing mode, the first object detection unit 30 detects an object from the entirety of the captured image with a high resolution acquired from the image acquisition unit 10, the processes in the image trimming unit 40, the resolution changing unit 50, and the second object detection unit 60 are skipped, the first object detection unit 30 supplies the object position information to the display apparatus 120, and the object detection frame is displayed in the captured image.

In the case of the high-speed processing mode, the first object detection unit 30 is not in operation. Therefore, the image trimming unit 40 trims the current the current image frame by using the object position information output by the first object detection unit 30 in response to a past image frame, and the resolution changing unit 50 reduces the resolution of the trimmed image. The second object detection unit 60 detects an object from the trimmed image with a reduced resolution and supplies the object position information to the display apparatus 120, and the object detection frame is displayed in the captured image.

Since the current image frame is trimmed by using the object position information detected by the first object detection unit 30 in a past image frame, the detected object may protrude from the trimmed image as a result of a movement of the driver's vehicle or the detected object or both.

The protrusion determination unit 70 determines whether the object detected by the second object detection unit 60 from the trimmed image protrudes from the trimmed image. For example, the object detection frame indicated by the object position information produced by the second object detection unit 60 has a substantially constant aspect ratio in successively captured images without a protruding object. Therefore, the protrusion determination unit 70 compares the aspect ratio of the object detection frame with a past frame and determines whether protrusion occurs by monitoring the presence of absence of a change. When the object protrudes from the trimmed image, the switching unit 20 changes the high-speed process switching flag from 1 to 0. Upon updating the high-speed process switching flag to 0, the switching unit 20 switches to the non-high speed processing mode. In the next frame, the first object detection unit 30 operates to detect an object from the entirety of the captured image again.

When the object does not protrude from the trimmed image, the high-speed process switching flag remains 1, and the first object detection unit 30 continues to be skipped. The current image frame is trimmed based on the object position information output by the first object detection unit 30 in a past image frame, the second object detection unit 60 detects an object from the trimmed image with a reduced resolution, and the object position information is output.

The object detection model storage unit 80 stores three types of object detection models including those for high resolution, medium resolution, and low resolution. The object detection model storage unit 80 may store object detection models configured to receive an input of four or more different types of resolution. The resolution of the image input to the object detection model is not limited to those described above. Further, the aspect ratio of the image input to the object detection model need not be 1:1 as described in the above example. For example, the object detection model for high resolution may be compatible with an input of an image having a 4K resolution of 2160 pixels in the vertical direction by 4096 pixels in the horizontal direction.

Figure 2:
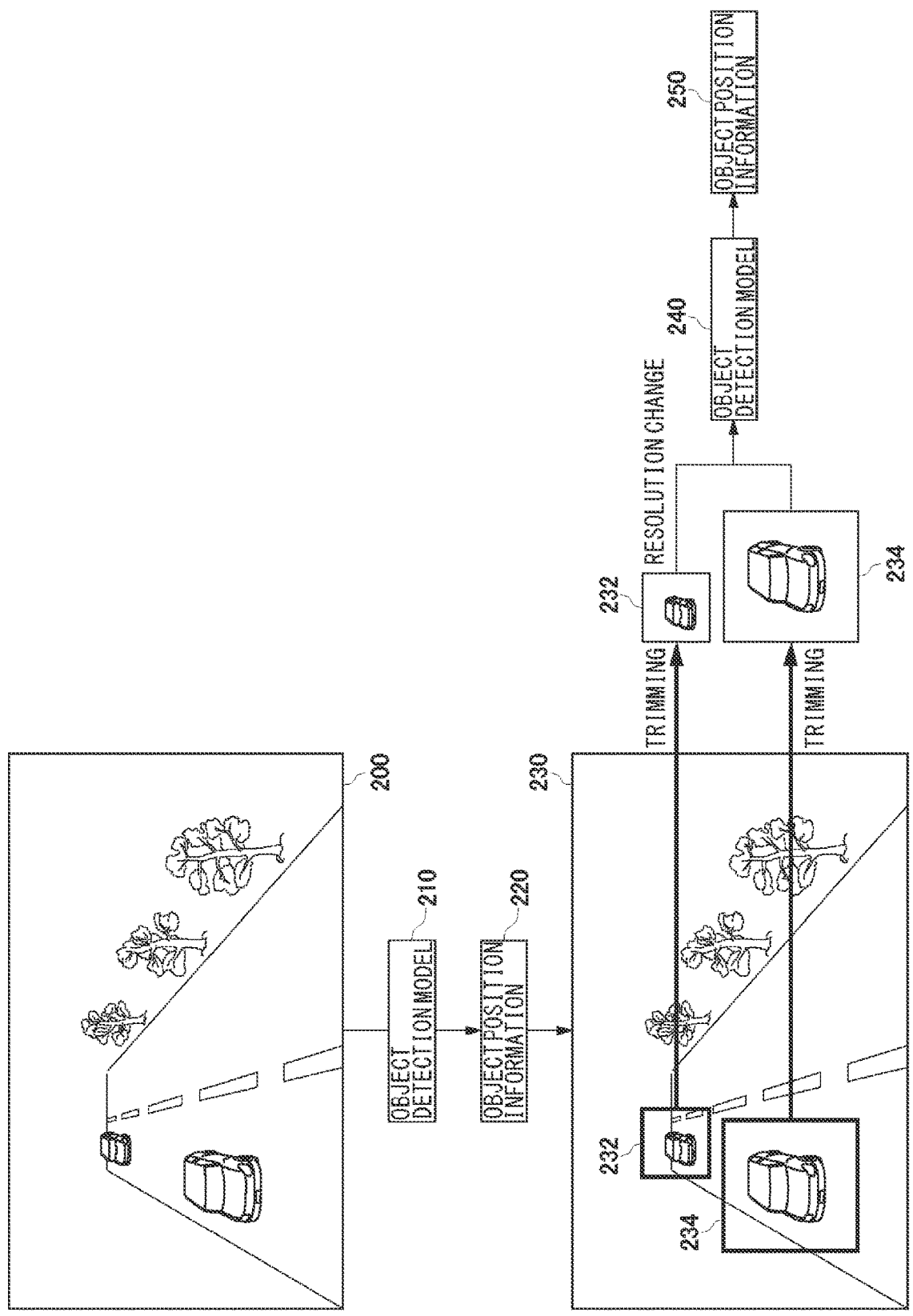
FIG. 2 shows an object detection method performed by the object detection apparatus of FIG. 1.

FIG. 2 shows an object detection method performed by the object detection apparatus 100 of FIG. 1.

A captured image 200 is an image of the scene in front captured by the imaging apparatus 110 such as a drive recorder mounted on the driver's vehicle. Two oncoming vehicles are captured on the road.

In the non-high speed processing mode, the first object detection unit 30 detects an object from the entirety of the captured image 200 by using an object detection model 210 for high resolution to produce object position information 220. In this case, two oncoming vehicles are detected on the road. The display apparatus 120 overlays an object detection frame for the two oncoming vehicles on the captured image 200 as displayed, based on the object position information 220 detected by the first object detection unit 30.

After the first object detection unit 30 produces the object position information 220 in the non-high speed processing mode, the mode is switched to the high-speed processing mode in the next frame.

In the high-speed processing mode, the image trimming unit 40 uses the object position information 220 produced by the first object detection unit 30 to extract trimmed imaged 232, 234 from a captured image 230 of the next frame. In this process, the trimmed images 232, 234 are extracted in a size larger than the object detection frame presented by the object position information 220. More specifically, the trimmed images 232, 234 of a size derived from expanding the object detection frame indicated by the object position information 220 by 1 to 100 pixels upward, downward, leftward, and rightward, respectively, are extracted. The resolution changing unit 50 changes the resolution of the trimmed images 232, 234. The trimmed image 232 of the oncoming vehicle which is relatively distant from the driver's vehicle and for which the object detection frame is relatively small is changed to a low resolution, and the trimmed image 234 of the oncoming vehicle which is nearer the driver's vehicle and for which the object detection frame is relatively large is changed to a medium resolution.

The second object detection unit 60 refers to the trimmed image 232 with a low resolution and the trimmed image 234 with a medium resolution and detects the objects by using the object detection models 240 adapted to the respective resolutions, thereby producing object position information 250.

Since the position of the oncoming vehicle relative to the driver's vehicle changes, the positions of the two oncoming vehicles vary in the respective trimmed images 232, 234. The object position information 250 extracted by the second object detection unit 60 will be different from the object position information 220 extracted by the first object detection unit 30.

The display apparatus 120 overlays the object detection frames for the two oncoming vehicles on the captured image 200 as displayed, based on object position information 250 detected by the second object detection unit 60.

So long as the two oncoming vehicles do not protrude from the respective trimmed images 232, 234, the high-speed processing mode is repeated, and the second object detection unit 60 detects the object from the trimmed images 232, 234 by using the object detection model 240 for medium resolution or low resolution, thereby producing the object position information 250.

When it is determined that either of the two oncoming vehicles protrudes from the trimmed image 232 or the trimmed image 234, the mode is switched to the non-high speed processing mode, and the first object detection unit 30 detects the object from the entirety of the captured image 200 by using the object detection model 210 for high resolution, thereby producing the object position information 220. The trimmed images may not be limited to the two trimmed images 232, 234. One trimmed image or three or more trimmed images may be processed. Regardless of the number of trimmed images, the mode is switched to the non-high speed processing mode when it is determined that protrusion occurs in any one of the trimmed images.

Figure 3B:
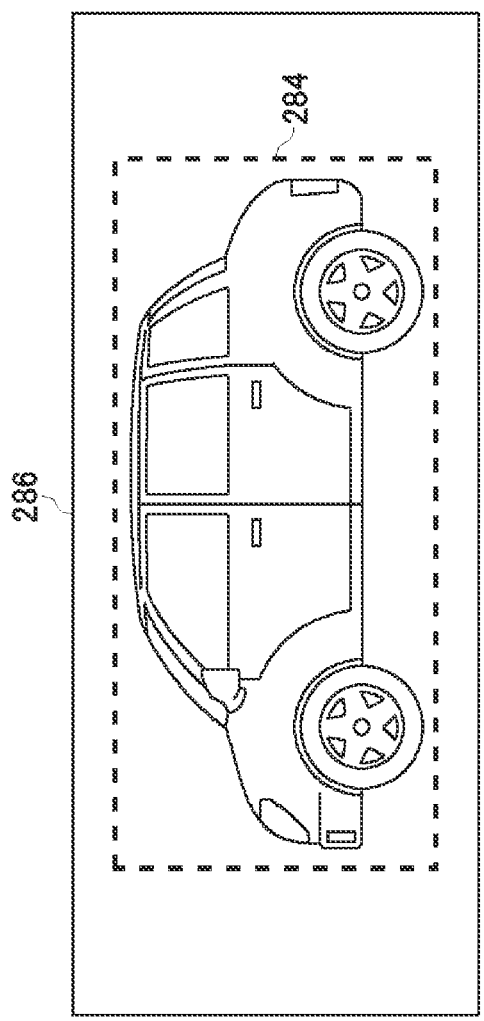
FIG. 3A and FIG. 3B show examples of trimmed images dependent on the orientation of the object.
Figure 3A:
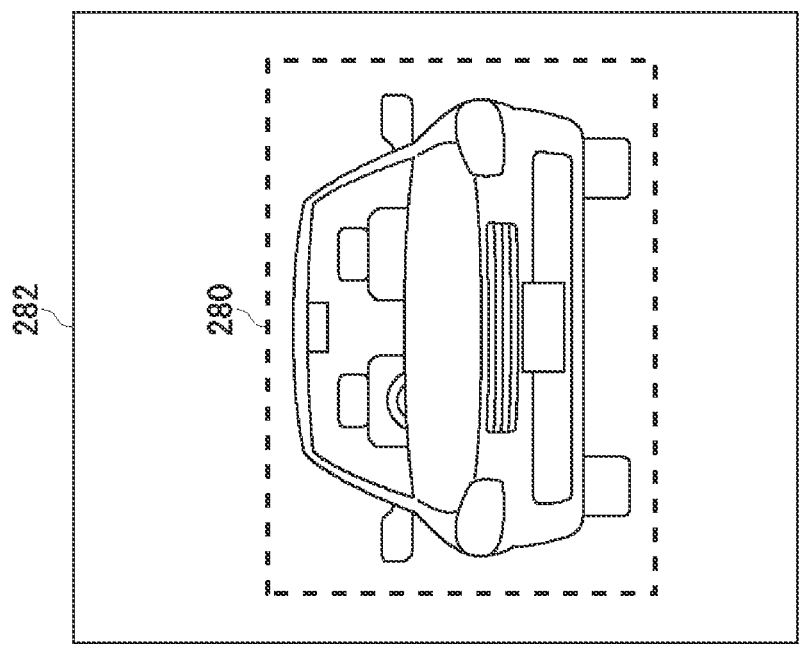

FIG. 3A and FIG. 3B show examples of trimmed images dependent on the orientation of the object. The dotted line denotes an object detection frame, and the solid line denotes a trimmed image.

FIG. 3A shows a case where the vehicle detected in the captured image faces frontward, and FIG. 3B shows a case where the detected vehicle faces leftward. When the vehicle faces frontward or rearward, the likelihood is high that the vehicle moves upward or downward on the screen. When the vehicle faces leftward or rightward, the likelihood is high that the vehicle moves leftward or rightward on the screen.

When a vehicle is detected in a capture image, therefore, the direction in which the vehicle moves on the screen varies depending on the orientation of the detected vehicle. By allowing the image trimming unit 40 to trim the captured image such that the trimmed image is larger in the direction in which the vehicle moves, it is possible to detect the vehicle within the trimmed image even when the vehicle moves so that the high-speed processing mode can be continued long.

In the case of FIG. 3A, the vehicle faces frontward. Therefore, the trimmed image 282 is extracted such that the size thereof in the vertical direction is larger relative to an object detection frame 280. For example, the image trimming unit 40 extracts the trimmed image 282 larger in the vertical direction than in the horizontal direction by 10 to 1000 pixels. In the case of FIG. 3B, the vehicle faces sideways. Therefore, the trimmed image 286 is extracted such that the size thereof in the horizontal direction is larger relative to an object detection frame 284. For example, the image trimming unit 40 extracts the trimmed image 286 larger in the horizontal direction than in the vertical direction by 10 to 1000 pixels.

The first object detection unit 30 can recognize the shape of the object detection frame by referring to the position information on the detected object and so can determine whether the detected vehicle face frontward, rearward, or sideways. When the object detection frame is elongated in the vertical direction, it is determined that the vehicle faces frontward or rearward. When the object detection frame is elongated in the horizontal direction, it is determined that the detected vehicle faces sideways. The first object detection unit 30 may supply information on the orientation of the detected object to the image trimming unit 40 in addition to the position information on the detected object.

The image trimming unit 40 may predict the direction of movement of the vehicle according to whether the vehicle shown in the captured image faces frontward, rearward, or sideways and determine the vertical and horizontal sizes of the trimmed image accordingly. Alternatively, the image trimming unit 40 may predict the direction of movement of the vehicle by referring to the movement of the vehicle between image frames and determine the vertical and horizontal sizes of the trimmed image accordingly.

Figure 4B:
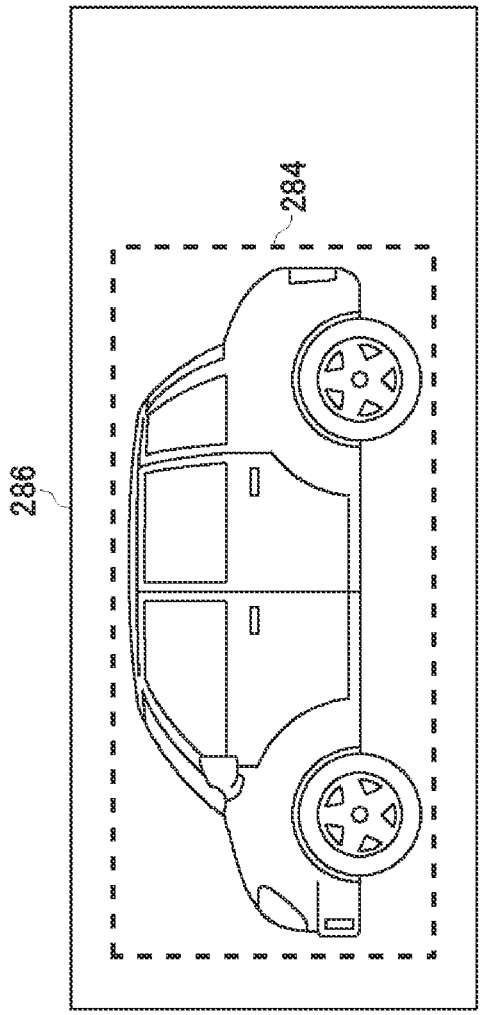
FIG. 4A and FIG. 4B show examples of trimmed images produced when the object moves in the direction of movement.
Figure 4A:
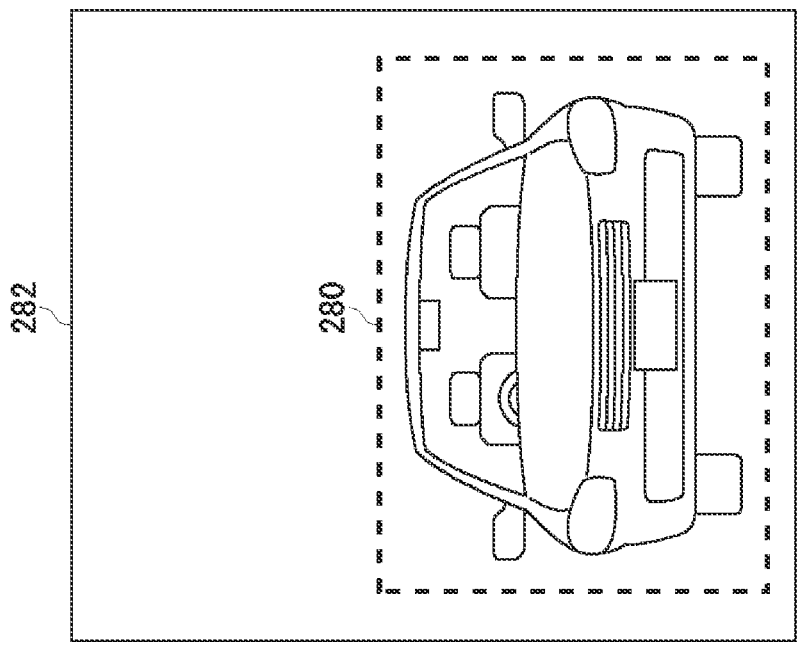

FIG. 4A and FIG. 4B show examples of trimmed images produced when the object moves in the direction of movement.

FIG. 4A shows a case where the vehicle moves forward within the trimmed image 282 of FIG. 3A. Within the trimmed image 282 in the solid line, the object detection frame 280 in the dotted line has moved downward. Since the trimmed image 282 is extracted in a size larger in the vertical direction, the object detection frame 280 does not protrude from the trimmed image even when the vehicle moves forward so that the high-speed processing mode can be continued.

FIG. 4B shows a case where the vehicle moves leftward within the trimmed image 286 of FIG. 3B. Within the trimmed image 286 in the solid line, the object detection frame 284 in the dotted line has moved leftward. Since the trimmed image 286 is extracted in a size larger in the horizontal direction, the object detection frame 284 does not protrude from the trimmed image even when the vehicle moves leftward so that the high-speed processing mode can be continued.

Figure 5B:
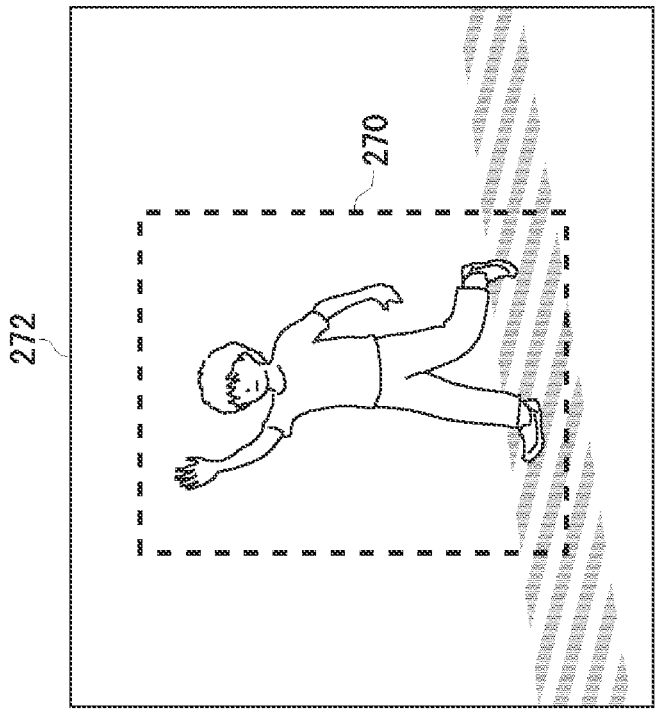
FIG. 5A and FIG. 5B show examples of trimmed images dependent on the relative moving speed of the object.
Figure 5A:
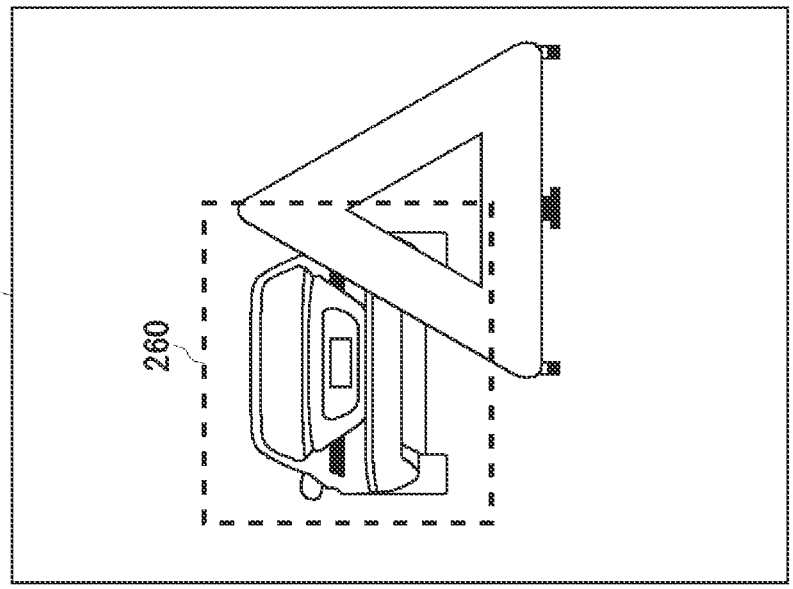

FIG. 5A and FIG. 5B show examples of trimmed images dependent on the relative moving speed of the object. When the moving speed of the object relative to the driver's vehicle is large, the object moves significantly within an image captured from the driver's vehicle. The object detected by the first object detection unit 30 may be inclusive of persons as well as vehicles. Further, the first object detection unit 30 may supply information indicating whether the detected object is a vehicle or a person, information on a stop board and a sign on the road, etc. to the image trimming unit in addition to the position information on the detected object. The image trimming unit 40 may acquire the speed of the driver's vehicle from a speedometer (not shown).

FIG. 5A shows a case where a stop board is put on the road and a vehicle temporarily at a stop is detected. When the other vehicle in front is moving in the same direction as the driver's vehicle, the speed of the other vehicle relative to the driver's vehicle becomes smaller. When the driver's vehicle is approaching the other vehicle at a stop, the speed of the other vehicle relative to the driver's vehicle becomes larger. Thus, when the image trimming unit 40 determines that the driver's vehicle is traveling and the detected vehicle is temporarily at a stop, the image trimming unit 40 extracts a trimmed image 262 in the solid line in a larger size relative to an object detection frame 260 in the dotted line than in the case of the trimmed images 232, 234 shown in FIG. 2, thereby preventing the other vehicle detected in subsequent image frames from protruding from the trimmed image 262. For example, the image trimming unit 40 extracts the trimmed image 262 of a size derived from expanding the object detection frame 260 in the dotted line by 10 to 1000 pixels upward, downward, leftward, and rightward, respectively. This ensures that the high-speed processing can be continued and a collision accident can be avoided properly.

FIG. 5a shows a case where a person walking into the road is detected. The moving speed of the person is small, but the moving speed of the person relative to the driver's vehicle will be large if the driver's vehicle is traveling at a high speed. Therefore, when the image trimming unit 40 determines that the driver's vehicle is traveling at a high speed and a person is detected, the image trimming unit 40 extracts a trimmed image 272 in the solid line in a larger size relative to an object detection frame 270 in the dotted line than in the case of the trimmed images 232, 234 shown in FIG. 2, thereby preventing a child detected in subsequent image frames from protruding from the trimmed image 272. For example, the image trimming unit 40 extracts the trimmed image 272 of a size derived from expanding the object detection frame 270 in the dotted line by 10 to 1000 pixels upward, downward, leftward, and rightward, respectively. This ensures that the high-speed processing can be continued and an accident causing injury or death can be avoided properly.

Figure 6:
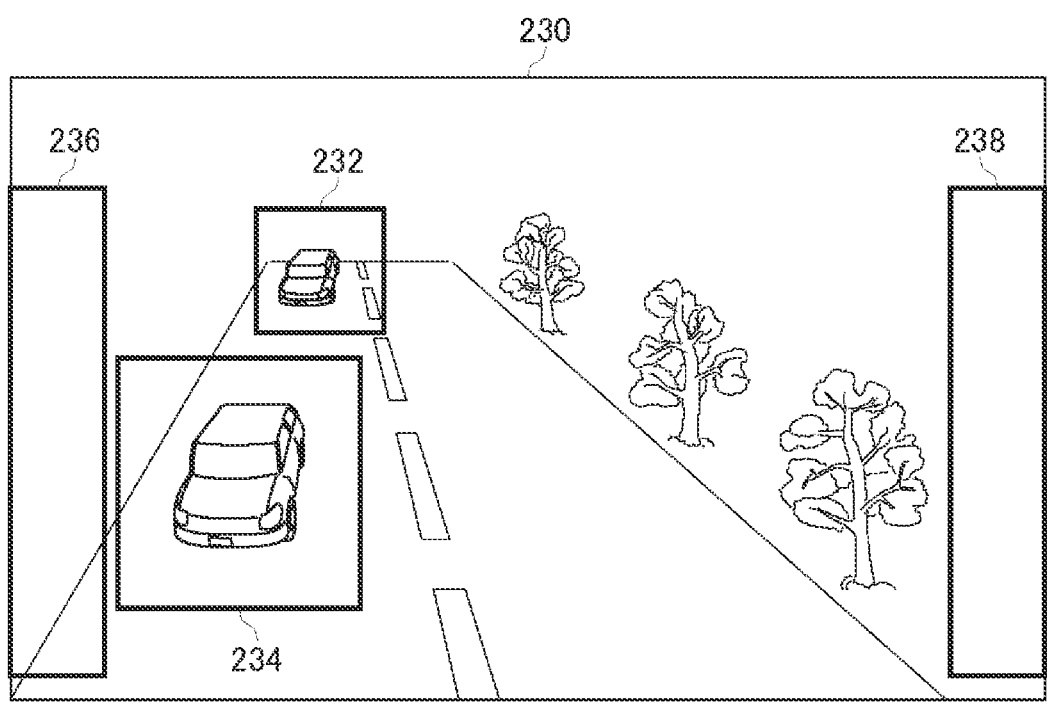
FIG. 6 shows another example of trimmed image.

FIG. 6 shows another example of trimmed image. End trimmed images 236, 238 are provided at the left and right ends of the captured image 230 in addition to the trimmed images 232, 234 for the two vehicles detected in the captured image 230. This is in preparation for a case where a person or a vehicle suddenly moves in from left or right on the road. For example, the end trimmed image 236 is in a range of 100 to 1000 pixels from the left end of the captured image 230 in the horizontal direction. For example, the end trimmed image 238 is in a range of 100 to 1000 pixels from the right end of the captured image 230 in the horizontal direction. The vertical direction of the end trimmed images 236, 238 may be in a range from the top end to the bottom end of the captured image 230, or the range may not include the neighborhood of the top end or the neighborhood of the bottom end.

In the non-high speed processing mode, the trimmed images 232, 234 are set based on the object position information on the two vehicles detected by the first object detection unit 30. Thereafter, in the high-speed processing mode, the same trimmed images 232, 234 are extracted from the subsequent image frame, and the two vehicles are tracked within the trimmed images 232, 234. In the high-speed processing mode, however, an object is not detected from the entirety of the captured image 230 so that an object suddenly moving in from left or right is not detected. This is addressed such that the image trimming unit 40 sets the end trimmed images 236, 238 at the left and right ends of the captured image 230 by default, the second object detection unit 60 detects, in the high-speed processing mode, an object also in the end trimmed images 236, 238 at the left and right ends, and the protrusion determination unit 70 determines whether protrusion occurs, thereby preventing an object moving in from left or right by any chance from being overlooked in the high-speed processing mode.

Figure 7:
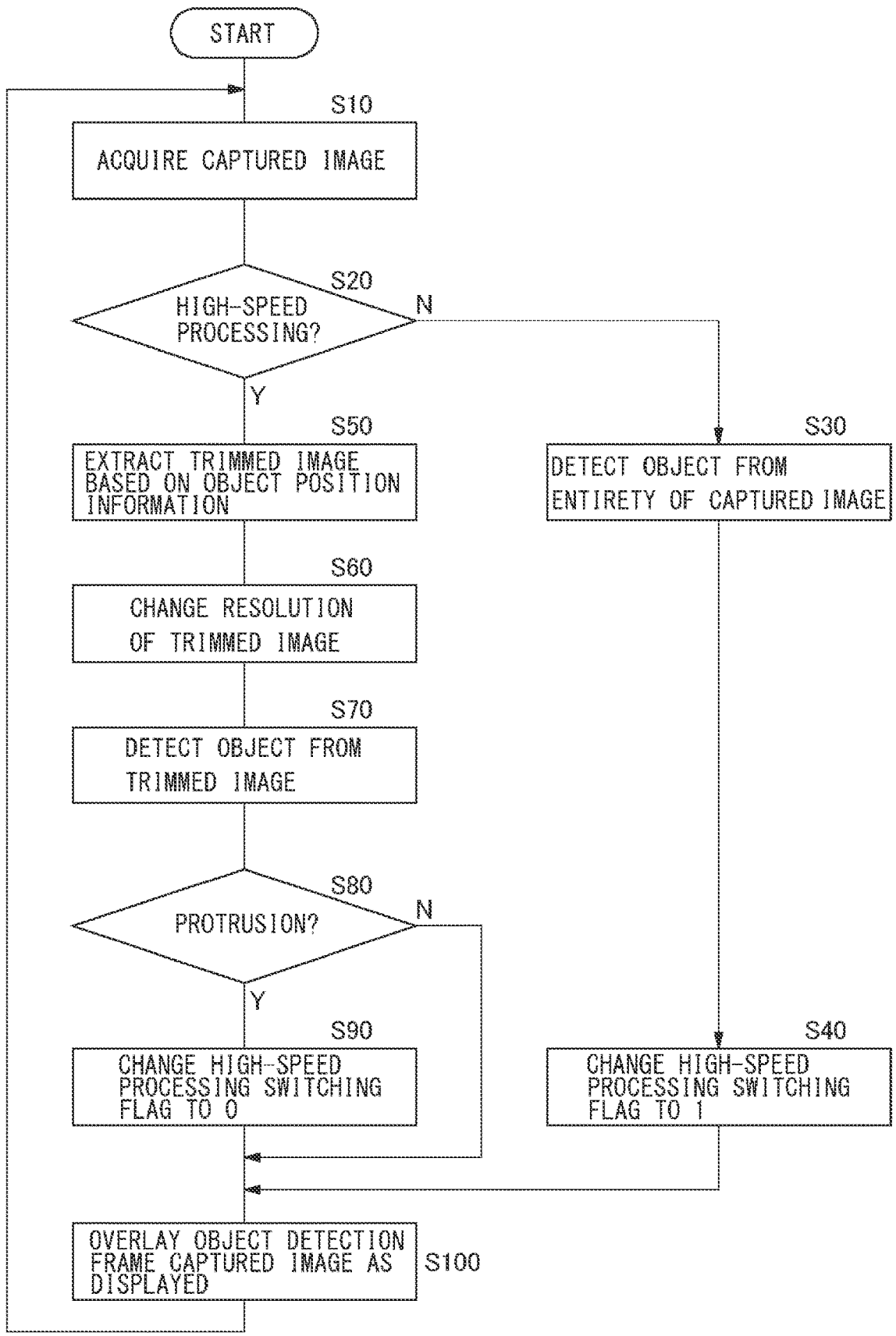
FIG. 7 is a flowchart showing a method of detecting an object in the object detection apparatus according to the embodiment.

FIG. 7 is a flowchart showing a sequence of steps for detecting an object in the object detection apparatus 100 according to the embodiment.

In the initial setting, the high-speed processing switching flag is initialized to 0.

The image acquisition unit 10 acquires a captured image from the imaging apparatus 110 (S10).

The switching unit 20 determines whether the high-speed processing mode is in use by referring to the high-speed processing switching flag (S20).

When the high-speed processing switching flag is 0 and the non-high speed processing mode is in use (N in S20), the first object detection unit 30 detects an object from the entirety of the captured image and supplies the object position information to the display apparatus 120 (S30), the switching unit 20 changes the high-speed processing switching flag to 1 (S40), and control proceeds to step S100.

When the high-speed processing switching flag is 1 and the high-speed processing mode is in use (Y in S20), steps S50, S60, S70, S80, and S90 are performed.

The image trimming unit 40 extracts a trimmed image from the current image frame based on the object position information on the past frame output by the first object detection unit 30 (S50). The resolution changing unit 50 changes the resolution of the trimmed image in accordance with the size of the trimmed image (S60). The second object detection unit 60 detects an object from the trimmed image with a reduced resolution and supplies the object position information to the display apparatus 120 (S70). Step S60 need not necessarily be performed. When control proceeds to step S70 without performing step S60, the second object detection unit 60 detects an object from the trimmed image extracted in step S50.

The protrusion determination unit 70 determines whether the object detected by the second object detection unit 60 protrudes from the trimmed image (S80). When the detected object protrudes from the trimmed image (Y in S80), the switching unit 20 changes the high-speed processing switching flag to 0 (S90), and control proceeds to step S100. When the detected object does not protrude from the trimmed image (N in S80), the high-speed processing switching flag is not updated, and control proceeds to step S100.

In the case of the non-high speed processing mode, the display apparatus 120 overlays the object detection frame on the captured image as displayed, based on the object position information detected by the first object detection unit 30. In the case of the high-speed processing mode, the display apparatus 120 overlays the object detection frame on the captured image as displayed, based on the object position information detected by the second object detection unit 60 (S100).

In one variation, the switching unit 20 may change the high-speed processing switching flag to 0 automatically when the high-speed processing mode continues for a predetermined period of time to enforce transition to the non-high speed processing mode. When the high-speed processing mode continues beyond a predetermined period of time, an object suddenly moving in might be overlooked since an object is not detected from the entirety of the captured image in the high-speed processing mode. By resetting the high-speed processing switching flag every time the predetermined period of time elapses to make a transition to the non-high speed processing mode and detect an object from the entirety of the captured image, an object suddenly moving in is avoided from being overlooked. The predetermined period of time may be, for example, one second. The predetermined period of time may be variable depending on the condition of traveling (e.g., whether the vehicle is traveling on an express way or traveling on an ordinary road).

The above-described various processes in the object detection apparatus 100 can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

As described above, according to the embodiment of the present invention, an object is detected from a trimmed image with a low resolution extracted based on the position information on an object detected from the entirety of a captured image instead of detecting an object from a captured image with a high resolution without exception. When the object protrudes from the trimmed image, the object is detected again from the entirety of the captured image with a high resolution. It is therefore possible to reduce the volume of operation and detect an object a high speed, while maintaining the detection precision at the same time.

Described above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. An object detection apparatus comprising:
   a first object detection unit that detects an object from a captured image and outputs object position information, in a non-high speed processing mode;
   a switching unit that switches to a high-speed processing mode when the first object detection unit outputs the object position information;
   an image trimming unit that extracts a trimmed image from the captured image based on the object position information output from the first object detection unit, in the high-speed processing mode;
   a second object detection unit that detects an object from the trimmed image and outputs the object position information; and
   a protrusion determination unit that determines whether the object detected by the second object detection unit protrudes from the trimmed image, wherein
   when it is determined that the object detected by the second object detection unit protrudes from the trimmed image, the switching unit switches to the non-high speed processing mode.

2. The object detection apparatus according to claim 1, wherein
   the image trimming unit sets end trimmed images by default at left and right ends of the captured image.

3. The object detection apparatus according to claim 1, the switching unit enforces a switch to the non-high speed processing mode when a predetermined period of time elapses in the high-speed processing mode.

4. The object detection apparatus according to claim 1, wherein
   the image trimming unit determines a vertical or horizontal size of the trimmed image in accordance with a direction of movement of the object detected by the first object detection unit.

5. The object detection apparatus according to claim 1, wherein
   the captured image is an image captured by an imaging apparatus mounted on a vehicle, and
   the image trimming unit determines a size of the trimmed image in accordance with a speed of the object detected by the first object detection unit relative to the vehicle.

6. An object detection method comprising:
   detecting an object from a captured image and outputting object position information, in a non-high speed processing mode;
   switching to a high-speed processing mode when the object position information is output;
   extracting a trimmed image from the captured image based on the object position information as output, in the high-speed processing mode;
   detecting an object from the trimmed image and outputting the object position information; and
   determining whether the object detected from the trimmed image protrudes from the trimmed image, wherein
   when it is determined that the object detected from the trimmed image protrudes from the trimmed image, the non-high speed processing mode is switched into use.

7. A non-transitory computer-readable recording medium having embodied thereon an object detection program comprising computer-implemented modules including:
   a first object detection module that detects an object from a captured image and outputs object position information, in a non-high speed processing mode;
   a switching module that switches to a high-speed processing mode when the object position information is output by the first object detection module;
   an image trimming module that extracts a trimmed image from the captured image based on the object position information output from the first object detection module, in the high-speed processing mode;
   a second object detection module that detects an object from the trimmed image and outputs the object position information; and
   a protrusion determination module that determines whether the object detected by the second object detection module protrudes from the trimmed image, wherein
   when it is determined that the object detected by the second object detection module protrudes from the trimmed image, the switching module switches to the non-high speed processing mode.

* * * * *